United States Patent
Fukuoka

(10) Patent No.: US 10,911,692 B2
(45) Date of Patent: Feb. 2, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Sho Fukuoka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 16/207,448

(22) Filed: Dec. 3, 2018

(65) Prior Publication Data

US 2019/0174074 A1 Jun. 6, 2019

(30) Foreign Application Priority Data

Dec. 4, 2017 (JP) ................................. 2017-232933

(51) Int. Cl.
*H04N 5/262* (2006.01)
*H04N 1/60* (2006.01)
*H04N 1/62* (2006.01)
*H04N 5/232* (2006.01)

(52) U.S. Cl.
CPC ......... *H04N 5/2621* (2013.01); *H04N 1/6011* (2013.01); *H04N 1/6013* (2013.01); *H04N 1/6052* (2013.01); *H04N 1/6097* (2013.01); *H04N 1/62* (2013.01); *H04N 1/622* (2013.01); *H04N 5/23229* (2013.01); *H04N 5/23245* (2013.01)

(58) Field of Classification Search
CPC .. H04N 1/6011; H04N 1/6013; H04N 1/6052; H04N 1/6097; H04N 1/62; H04N 1/622; H04N 5/23229; H04N 5/23245; H04N 5/2621

See application file for complete search history.

(56) References Cited

U.S. PATENT DOCUMENTS

2010/0149563 A1\* 6/2010 Otomaru ............... H04N 1/6052
358/1.9
2010/0157341 A1\* 6/2010 Mori ..................... G06F 3/1208
358/1.9

FOREIGN PATENT DOCUMENTS

JP 2017-005626 A 1/2017

\* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An information processing apparatus is provided to facilitate a user's understanding of which area of an image has a higher degree of change when image processing is performed on the image. The information processing apparatus displays, on a display device, information indicating a relationship in magnitude between a first amount of change by the image processing in a first area included in a predetermined image and a second amount of change by the image processing in a second area included in the predetermined image.

13 Claims, 10 Drawing Sheets

FIG.6

| DIVIDED IMAGE INDEX | (1) | (2) | (3) | (4) |
|---|---|---|---|---|
| DISPLAY DATA | 180 | 80 | 80 | 40 |

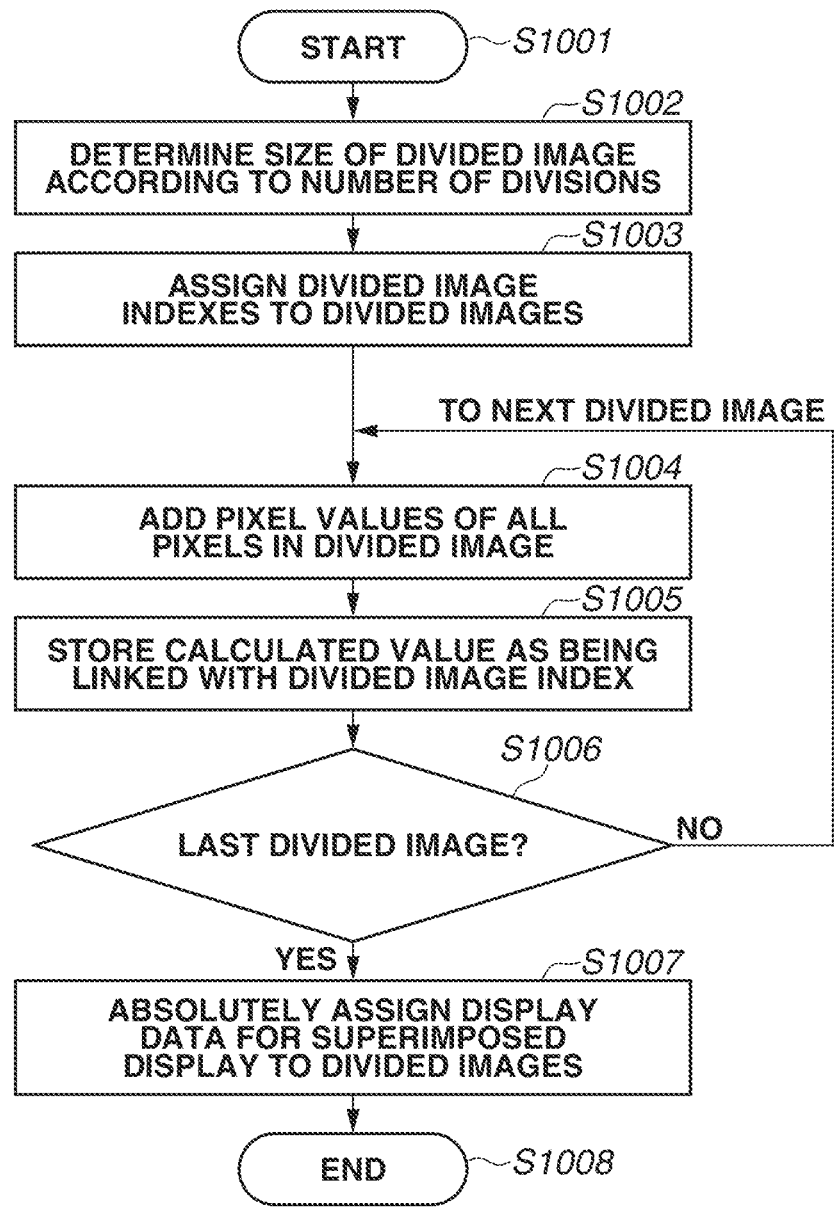

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium for displaying, on a display device, information about an amount of change when image processing is performed on a predetermined image.

Description of the Related Art

With the prevalence of digital cameras, smartphones with a camera function, and high definition displays, users who perform image processing on an image have been increasing in recent years. Display methods for a user to check the effect of image processing on an image have been devised. Japanese Patent Application Laid-Open No. 2017-005626 discusses a method for determining a suitable area in an image to check the effect of image processing.

Some image processing takes account of characteristics of an output device different from the display device in outputting an image, like those of a printer in printing an image. Examples of such characteristics include printing tonality. The display device and the output device may have different output characteristics such as different tonalities. As discussed in Japanese Patent Application Laid-Open No. 2017-005626, even if the image-processed image is displayed, the user therefore may be unable to fully figure out from the display how the image output by the output device is changed by the image processing.

If an image includes a desirable area and an undesirable area to be greatly changed by image processing, the user is therefore sometimes not able to figure out which area changes more greatly.

SUMMARY

The present disclosure is directed to providing a technique for facilitating the user's understanding of which area of an image changes more greatly when image processing is performed on the image.

According to an aspect of the present disclosure, an information processing apparatus configured to display an image on a display device includes at least one processor which performs, on a predetermined image, image processing according to a characteristic of an output device different from the display device in outputting an image, and displays information on the display device by analyzing the predetermined image, the information concerning an amount of change when the image processing is performed on the predetermined image, wherein the at least one processor displays the information on the display device so that the information indicates a relationship in magnitude between a first amount of change in a first area included in the predetermined image and a second amount of change in a second area included in the predetermined image.

Further features of the present disclosure will become apparent from the following description of exemplary embodiments with reference to the attached drawings.

BRIEF DESCRIPTION OF THE DRAWINGS

FIG. 6 is a diagram illustrating an example of display data assigned to divided images.

FIG. 10 is a flowchart in absolutely measuring the amounts of change in pixel values before and after image processing according to a difference image and the values of a division number input area.

DESCRIPTION OF THE EMBODIMENTS

Figure 1:
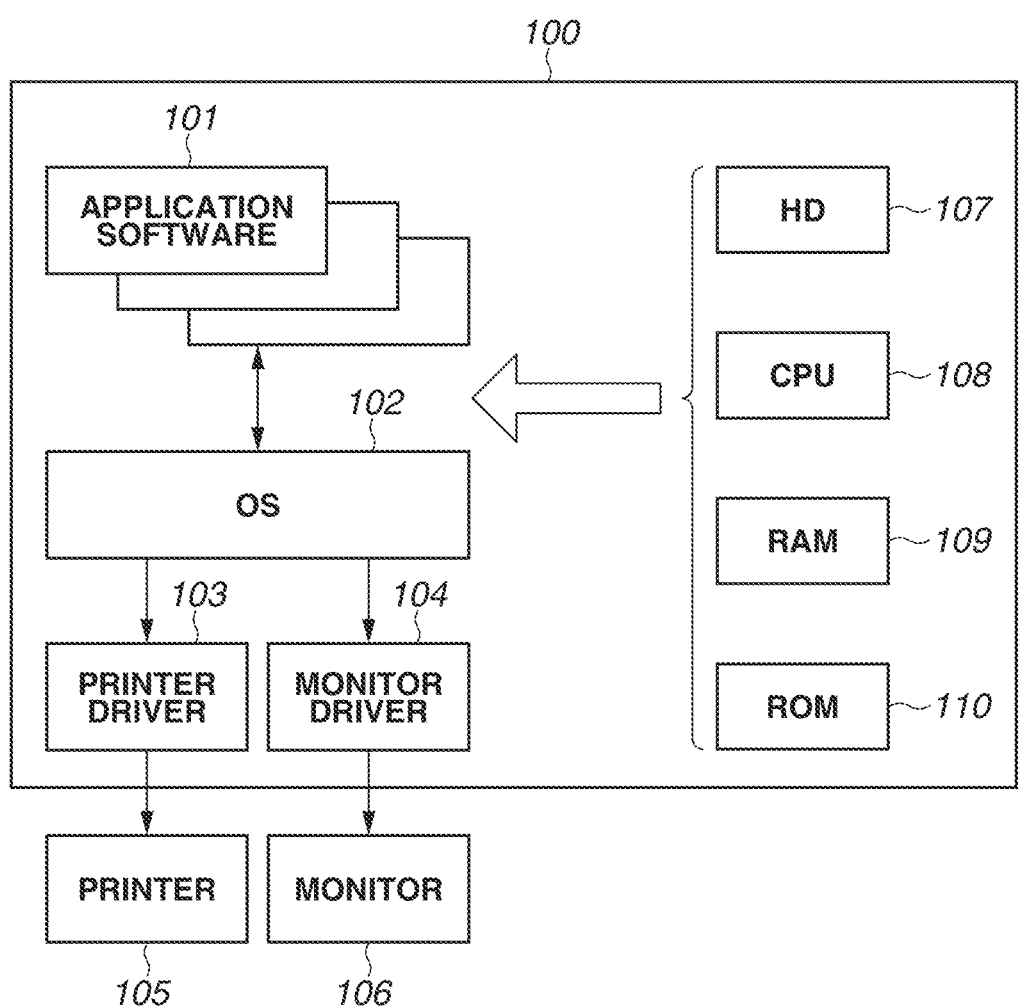
FIG. 1 is a diagram illustrating an example of an information processing system according to an exemplary embodiment.

An exemplary embodiment of the present disclosure will be described concretely and in detail below with reference to the accompanying drawings. In the following description, similar components are designated by and described with the same reference numerals throughout the drawings.

A first exemplary embodiment will be described below. FIG. 1 is a diagram illustrating an example of an information processing system according to the present exemplary embodiment. A host computer 100 serving as an information processing apparatus according to the present exemplary embodiment is connected to a printer 105 and a monitor 106. The host computer 100 includes pieces of application software 101 such as a word processor, a spreadsheet, and an Internet browser. A group of various drawing commands (image drawing commands, text drawing commands, and graphics drawing commands) expressing an output image, issued by the application software 101, is input to a monitor driver 104 via an operating system (OS) 102. In performing printing, the group of drawing commands is also input to a printer driver 103 via the OS 102. The printer driver 103 is software for processing the group of drawing commands to generate print data and causing the printer 105 to print the print data. The monitor driver 104 is software for processing the group of drawing commands and displaying an image on the monitor 106.

To run the foregoing pieces of software, the host computer 100 includes a central processing unit (CPU) 108, a hard disk (HD) 107, a random access memory (RAM) 109, and a read-only memory (ROM) 110 as its hardware configuration. Programs corresponding to the respective pieces of software 101 to 104 in FIG. 1 are stored in the HD 107 or the ROM 110. The CPU 108 can implement the functions of the respective pieces of software 101 to 104 by reading out and executing the programs on the RAM 109.

The host computer 100 includes a not-illustrated operation unit or is connected to an external operation device. The CPU 108 inputs user's instructions in the operation unit or operation device, and performs various types of processing according to the instructions. Examples of the operation unit and operation device include a mouse and a keyboard. A touch panel integrating the operation unit or operation device and the monitor 106 may be used.

With the foregoing configuration, for example, an arbitrary piece of application software 101 having a print function is installed on the host computer 100, and the monitor 106 and the printer 105 are controlled by processing of the CPU 108. The application software 101 generates output image data by using various types of data. The "various types of data" includes text data classified as text such as characters, graphics data classified as graphics such as a figure, and image data classified as photographic images. The CPU 108 can output the generated output image data to the monitor 106 and display the output image data on the monitor 106. The application software 101 also makes a printing output request to the OS 102. A group of drawing commands including text drawing commands for text data sections, graphics drawing commands for graphics data sections, and image drawing commands for image data sections is then issued to the OS 102. The OS 102 draws data according to the group of drawing commands, and the printer driver 103 generates print data based on the drawn data. The print data is transmitted to the printer 105, whereby printing is performed.

Figure 2A:
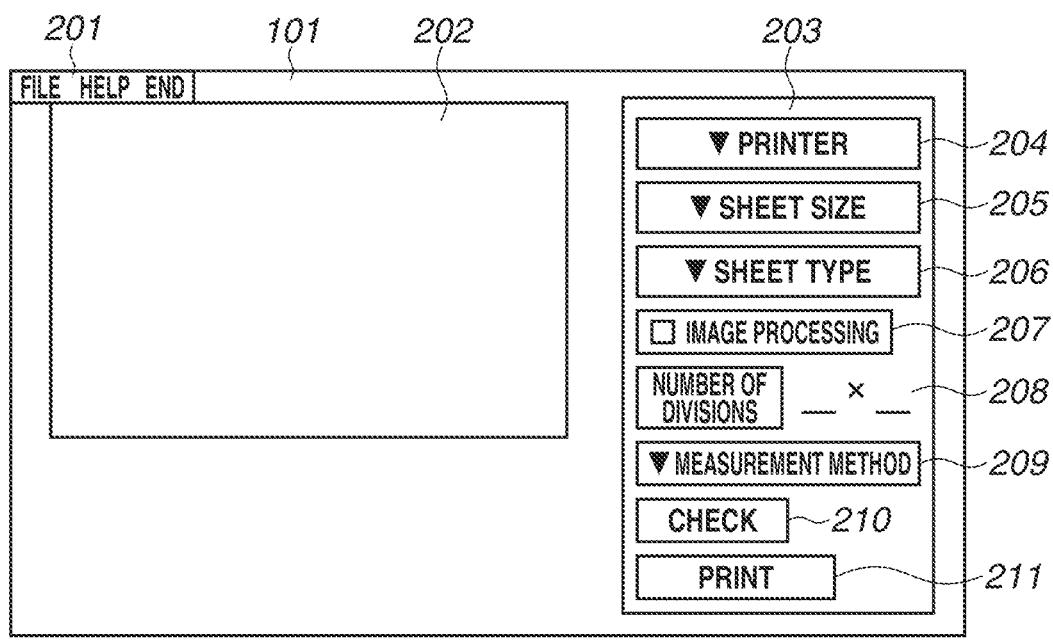
FIGS. 2A and 2B are diagrams illustrating examples of screens displayed by application software.
Figure 2B:
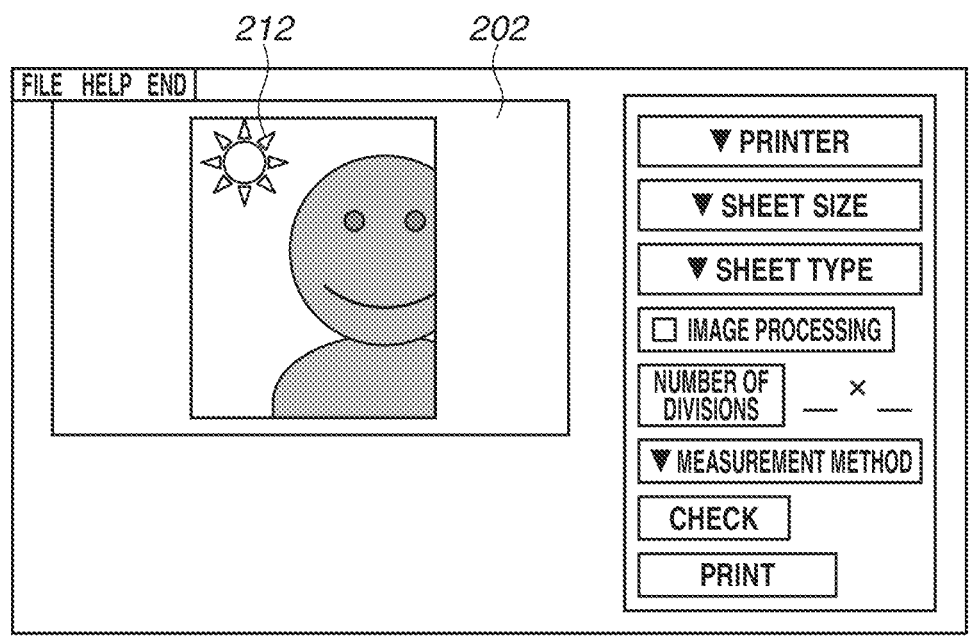

FIGS. 2A and 2B are diagrams illustrating examples of screens displayed by the application software 101. The screens illustrated in FIGS. 2A and 2B are displayed on the monitor 106 by the CPU 108 executing the application software 101 and the monitor driver 104.

FIG. 2A is a diagram illustrating an example of a screen for instructing image editing. The screen illustrated in FIG. 2A includes various display items 201 to 211. A menu operation section 201 is a display item from which the user can give instructions to end the application software 101, add an image to a page, and display help information. A preview area 202 is a display area for displaying an image to be edited and the amounts of change in pixel values by image processing. FIG. 2B is a diagram illustrating an example of a state where an image 212 is displayed in the preview area 202.

A printer selection pull-down menu 204, a sheet size selection pull-down menu 205, and a sheet type selection pull-down menu 206 are display items for the user to select a printer, a sheet size, and a sheet type to be used for printing, respectively. These display items display settable selection candidates, and the user selects setting values from the selection candidates.

An image processing application checkbox 207 is a display item for the user to specify whether to apply image processing to the image to be edited. In the present exemplary embodiment, image processing for correcting changes in image quality due to the printer 105 is described as an example. An original image can sometimes change in brightness, color, and/or sharpness because of printing characteristics of the printer 105. The foregoing image processing can compensate for the printing characteristics of the printer 105 by performing image processing related to brightness, color, and/or sharpness on the original image in advance according to characteristics of the change(s). For example, if an image darkens when printed by the printer 105, image processing is performed to make the original image brighter according to the degree of darkening. The original brightness can be expressed by performing printing in such a state. The type and intensity of the image processing are changed as appropriate according to the characteristics and print settings of the printer 105 that performs the printing.

A division number input area 208 is a display item for specifying the number of areas of the image to display the amounts of change by the image processing. In the present exemplary embodiment, display is made to indicate the amounts of change by the image processing in as many respective areas as specified by the division number input area 208. A mode of display will be described below. The division number input area 208 accepts inputs of respective arbitrary numerical values as the number of divisions in the width direction and the number of divisions in the height direction of the image.

In the present exemplary embodiment, the amounts of change by the image processing are measured in the respective plurality of areas of the image. A measurement method selection pull-down menu 209 is a display item for the user to select the measurement method. In the present exemplary embodiment, the selection candidates of the measurement method selection pull-down menu 209 are two types of measurement methods, an absolute measurement method and a relative measurement method. By the absolute measurement method, the amounts of change by the image processing in the respective plurality of areas of the image are individually measured, and information indicating the amounts of change is displayed. By the relative measurement method, a ratio or a relationship in magnitude between the amounts of change by the image processing in the plurality of areas of the image is measured, and information indicating the ratio or the relationship in magnitude is displayed.

A check button 210 is a button for the user to instruct display for checking the amounts of change of the image by the image processing. If the check button 210 is pressed, the CPU 108 measures the amounts of change in pixel values included in the image according to the settings of the division number input area 208 and the measurement method selection pull-down menu 209. The CPU 108 then superimposes and displays information indicating the measurement result of the amounts of change in the pixel values on the image displayed in the preview area 202. The result of display will be described below.

A print button 211 is a button for giving an instruction to print an image. For example, if the print button 211 is pressed when an image is displayed in the preview area 202, the CPU 108 runs the printer driver 103 to cause the printer 105 to print the image. During the printing, the CPU 108 determines whether to apply the image processing on the image to the printing thereof according to the setting of the image processing application checkbox 207 when the print button 211 is pressed. According to the determination result, the image on which the image processing is performed or the image on which the image processing is not performed is transmitted to the printer 105. The CPU 108 issues a print instruction, according to the print settings set by the sheet size selection pull-down menu 205 and the sheet type selection pull-down menu 206, to the printer selected by the printer selection pull-down menu 204 when the print button 211 is pressed. The information indicating the amounts of change by the image processing is not printed even if the print button 211 is pressed when the information is superimposed and displayed on the image.

In the present exemplary embodiment, if the image processing application checkbox 207 is not checked, the division number input area 208, the measurement method selection pull-down menu 209, and the check button 210 are controlled not to be operable. In some exemplary embodiments, such control may be omitted.

Figure 3:
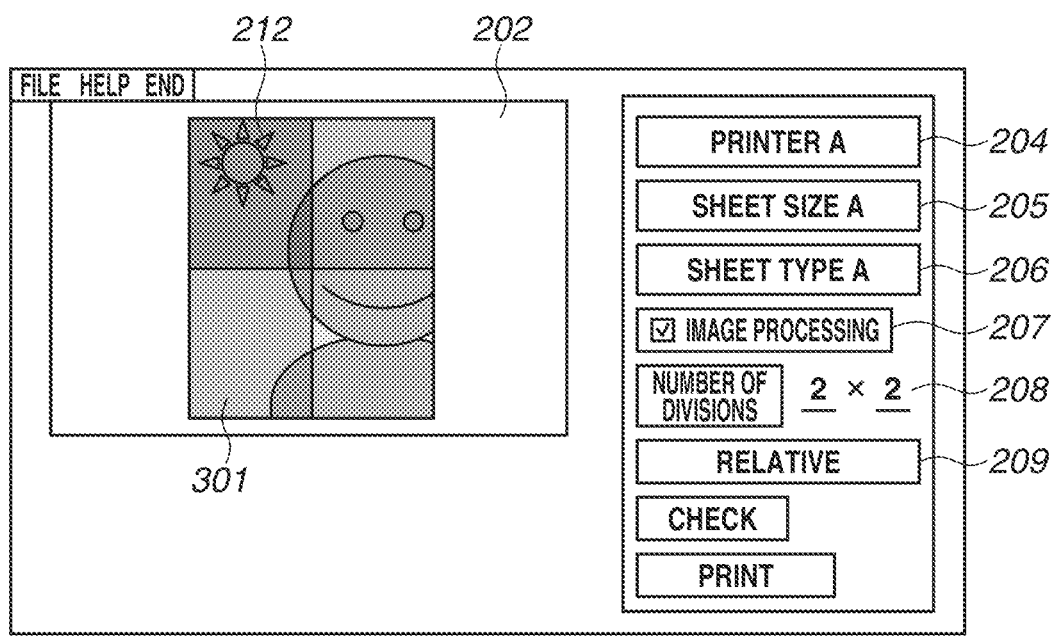
FIG. 3 is a diagram illustrating an example of a display result for checking amounts of change by image processing.

FIG. 3 is a diagram illustrating an example of the display result for checking the amounts of change by the image processing.

The screen illustrated in FIG. 3 is displayed if the check button 210 is pressed in a state where arbitrary settings are made by the user to the display items 204 to 209 described in FIG. 2. As illustrated in FIG. 3, a measurement result image 301 indicating the measurement result of the amounts of change in the pixel values is superimposed and displayed on the image 212 displayed in the preview area 202.

The measurement result image 301 expresses the measurement result of the amounts of change in the pixel values by using gradations of specific color. For example, the measurement result image 301 is superimposed and displayed so that the greater the amount of change of an area, the higher the density of the specific color. For example, suppose that the image 212 is divided into four equal areas based on the number of divisions "2×2", and the upper left area has a large amount of change, the lower left and upper right areas each have a medium amount of change, and the lower right area has a small amount of change. FIG. 3 illustrates the display result in such a case.

Now, processing to be performed when the check button 210 is pressed in a state where the relative measurement method is selected by the measurement method selection pull-down menu 209 will be described. By the relative measurement method, the CPU 108 generates a difference image indicating differences between the pixel values of the image 212 before the image processing and those of the image 212 after the image processing.

Figure 4:
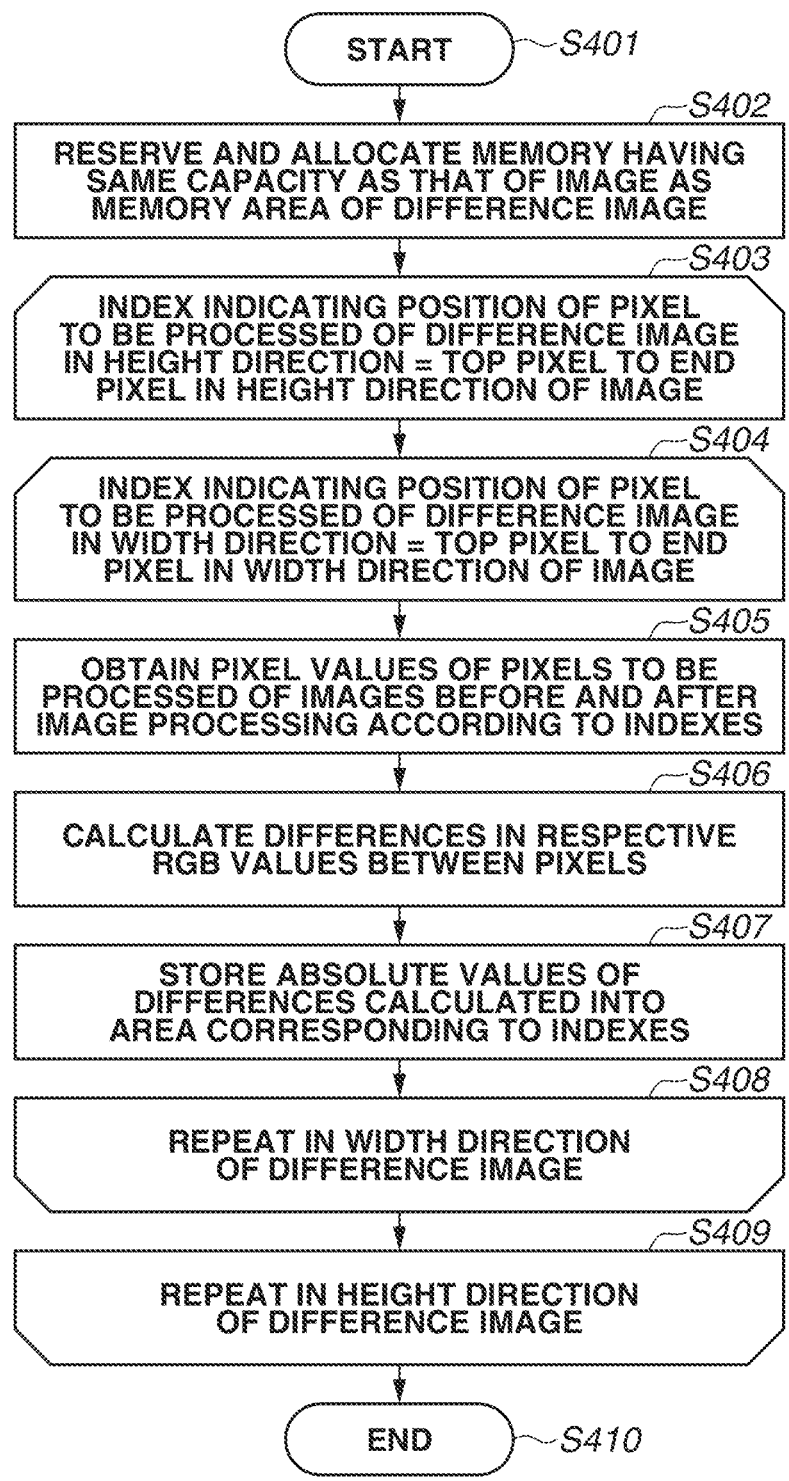
FIG. 4 is a flowchart illustrating processing for generating a difference image.

FIG. 4 is a flowchart illustrating processing for generating a difference image. Programs corresponding to the flowchart illustrated in FIG. 4 and flowcharts illustrated in FIGS. 5, 8, and 10 to be described below are included in the application software 101. The CPU 108 implements the processing illustrated in FIGS. 4, 5, 8, and 10 by executing the programs on the RAM 109.

In step S401, the CPU 108 starts the processing illustrated in FIG. 4 according to the pressing of the check button 210. In step S401, the CPU 108 performs predetermined image processing on the image 212, and stores the image 212 after the image processing into the RAM 109 along with the image 212 before the image processing.

In step S402, the CPU 108 reserves, in the RAM 109, memory having capacity capable of storing an image having the same number of pixels as that of the image 212, and allocates the memory as a memory area for a difference image. In the present exemplary embodiment, the range of values that can be set as pixel values of the difference image is the same as that of the image 212. In step S402, the CPU 108 therefore reserves a memory area having the same capacity as that of the memory area for the image 212.

In step S403, the CPU 108 initially assigns a topmost pixel of the image 212 as an index indicating the position of a pixel to be processed of the difference image in a height direction. For example, the application software 101 defines an XY coordinate system with an origin at the upper left of the image 212, as a two-dimensional coordinate system of the image 212 and the difference image. In step S403, Y=0 is initially set as the index indicating the position of the pixel to be processed of the difference image in the height direction. Such an index corresponds to the areas storing the pixel values of the pixel of the image 212 before and after the image processing and the area to store the pixel value of the pixel of the difference image.

In step S404, the CPU 108 initially assigns, by similar processing to that of step S403, a leftmost pixel of the image 212 as an index indicating the position of the pixel to be processed of the difference image in a width direction. In the foregoing XY coordinate system, X=0 is initially set as the index indicating the position of the pixel to be processed of the difference image in the width direction.

In step S405, the CPU 108 obtains the pixel value of the pixel to be processed of the image 212 before the image processing and the pixel value of the pixel to be processed of the image 212 after the image processing according to the values of the indexes set in steps S403 and S404. Suppose here that red, green, and blue (RGB) values are obtained as the pixel values of the images. In step S406, the CPU 108 calculates differences in the respective RGB values obtained in step S405 between the pixels. In step S407, the CPU 108 stores the absolute values of the differences calculated in step S406 into the RAM 109. Specifically, the CPU 108 stores the absolute values of the differences into the area corresponding to the indexes set in steps S403 and S404 in the memory area reserved in step S402.

In steps S408 and S409, the CPU 108 updates the indexes indicating the positions in the width direction and height direction of the image 212 and the difference image. Specifically, the values of X and Y in the foregoing XY coordinate system are incremented in step S408 and S409. By the processing of steps S404 and S408, the processing of steps S405 to S407 is performed on all pixels in the width direction of the image 212 and the difference image. By the processing of steps S403 and S409, the processing of steps S404 to S408 is performed on all pixels in the height direction of the image 212 and the difference image. Difference values about all the pixels of the image 212 between before and after the image processing are thereby calculated to generate a difference image.

By the processing illustrated in FIG. 4, the target image 212 to be image-processed is analyzed and the difference image is generated. In such a manner, areas of the image 212 where the amounts of change by the image processing are large or areas where the amounts of change by the image processing are small (i.e., areas where the image processing has a large effect or areas where the image processing has a small effect) are detected. However, the method of analysis is not limited thereto. For example, if image characteristics of areas where the amounts of change by the image processing are large are recognized in advance, such image characteristics of the image 212 may be analyzed. For example, some types of image processing may cause a greater amount of change as the pixels corresponding to a specific color increase. In such a case, the number of pixels corresponding to the specific color in each area of the image 212 may be analyzed. That is, the image processing does not need to be actually performed.

Figure 5:
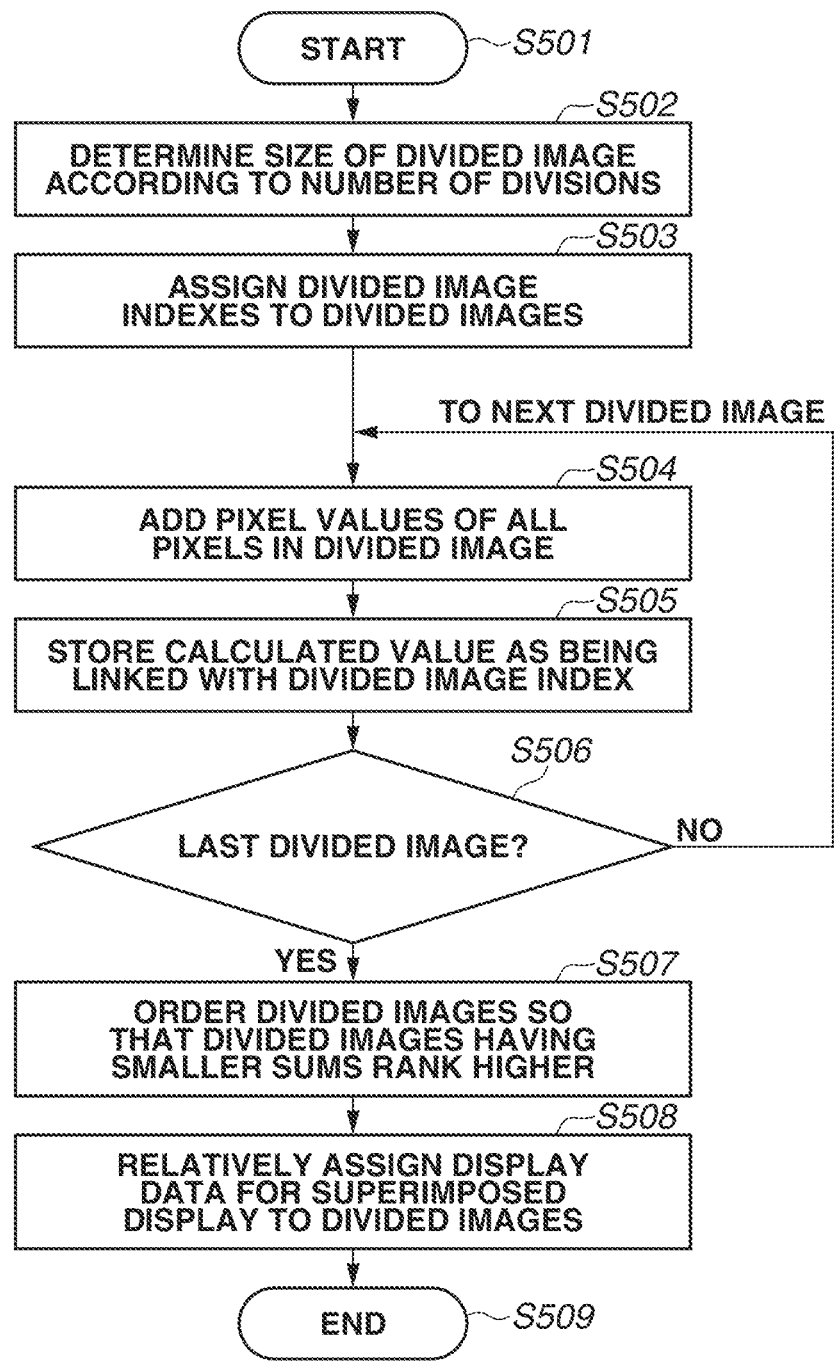
FIG. 5 is a flowchart illustrating processing for calculating the amounts of change before and after the image processing by a relative calculation method.

FIG. 5 is a flowchart illustrating processing for calculating the amounts of change before and after the image processing according to the relative calculation method. In step S501, the CPU 108 starts the processing illustrated in FIG. 5 according to the generation of the difference image by the processing illustrated in FIG. 4. In step S502, the CPU 108 determines the size of the image of each area (referred to as divided image) into which the difference image is divided according to the setting of the division number input area 208. Specifically, the CPU 108 divides the width of the difference image (the number of pixels in the X direction) by the numerical value of the width direction set in the division number input area 208. Similarly, the CPU 108 divides the height of the difference image (the number of pixels in the Y direction) by the numerical value of the height direction set in the division number input area 208. The CPU 108 then determines, as the size of a divided image, the numbers of pixels in the width and height directions, which have been obtained by the divisions in the width and height directions.

In step S503, the CPU 108 assigns divided image indexes to the divided images. Specifically, the CPU 108 defines indexes for referring to the memory areas corresponding to the respective divided images in the memory area in the RAM 109 where the difference image is stored. In step S503, to each pixel included in the difference image is assigned, information corresponding to the divided image including the pixel is assigned as a divided image index. For example, if the number of divisions of 2×2 is set in the division number input area 208, each pixel is given any one of four types of information as a divided image index.

In step S504, the CPU 108 adds the pixel values of all pixels in a specific divided image. Specifically, the CPU 108 obtains the pixel values of the pixels to which a specific division image index is given, and adds the pixel values. Since the divided image is a part of the difference image, the amount of change in that partial area of the image 212 before and after the image processing is calculated by the processing of step S504. In step S505, the CPU 108 stores the value calculated in step S504 into the RAM 109 as being linked with the divided image index. In step S506, the CPU 108 determines whether the processing of steps S504 and S505 has been performed on all the divided images. If the processing has not been performed on all the divided images (NO in step S506), the processing returns to step S504. That is, the CPU 108 updates the divided image index to one corresponding to an unprocessed divided image, and performs the processing of steps S504 and S505. If the processing of steps S504 and S504 has been performed on all the divided images (YES in step S506), the processing proceeds to step S507.

In step S507, the CPU 108 compares the sums of the respective divided images stored in step S505, and ranks the divided images in such an order that a divided image having a smaller sum ranks higher. In other words, divided images corresponding to areas where the amount of change before and after the image processing is smaller rank higher.

In step S508, the CPU 108 relatively assigns, to the divided images, display data (brightness) to be used for superimposed display as illustrated in FIG. 3. Specifically, the CPU 108 calculates "(the order of the divided image/the number of divisions)×255" for each divided image. The CPU 108 then determines the display data according to the calculated values, and stores the determined display data into the RAM 109 as being linked with the indexes of the respective divided images. For example, the application software 101 associates the range of values calculated by the foregoing calculation formula with the values of display data, and assigns display data corresponding to the range in which the values actually calculated by the calculation formula are included. Since the calculation in step S508 uses a value of 255, the maximum value of the display data is 255. Such a value is set based on the assumption that the output image of the measurement result image 301 to be superimposed and displayed has a bit depth of 8 bits. The value may be modified as appropriate according to the number of bits processable or displayable by the OS 102, the monitor driver 104, and the output device.

Various methods may be used to determine the display data in step S508. For example, the application software 101 may define a table showing display data corresponding to the order determined in step S507, with respect to each settable number of divisions. In such a case, the CPU 108 can assign display data to the divided images without using the foregoing calculation formula.

In step S508, as the order of a divided image is lower (the amount of change is in the area to which the divided image corresponds is larger), the value of the display data assigned is greater. In other words, divided images corresponding to areas where the image processing has a large effect are assigned display data of large values.

Figure 7:
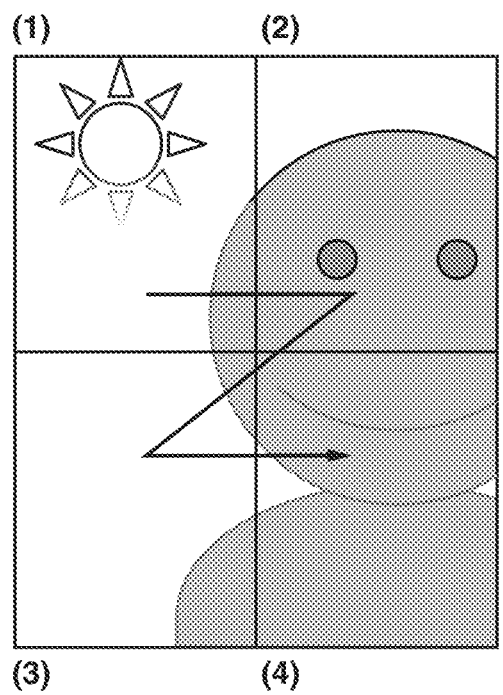
FIG. 7 is a diagram illustrating areas to which the divided images correspond.

FIG. 6 is a diagram illustrating an example of display data assigned to divided images. Specifically, FIG. 6 illustrates the display data stored as being linked with the divided image indexes by the processing described in step S508. FIG. 7 is a diagram illustrating the areas of the image 212 corresponding to the divided images. The numerals illustrated in FIG. 7 indicate the divided image indexes assigned to the divided images in FIG. 6. The image illustrated in FIG. 7 is the image 212 after the image processing is performed. The upper left area corresponding to the divided image index (1) shows a partial fade in color due to the effect of the image processing. In other words, the image processing produces a large effect on the upper left area, compared to the other areas. As illustrated in FIG. 6, display data of a large value is thus assigned to the divided image corresponding to the divided image index (1).

Figure 8:
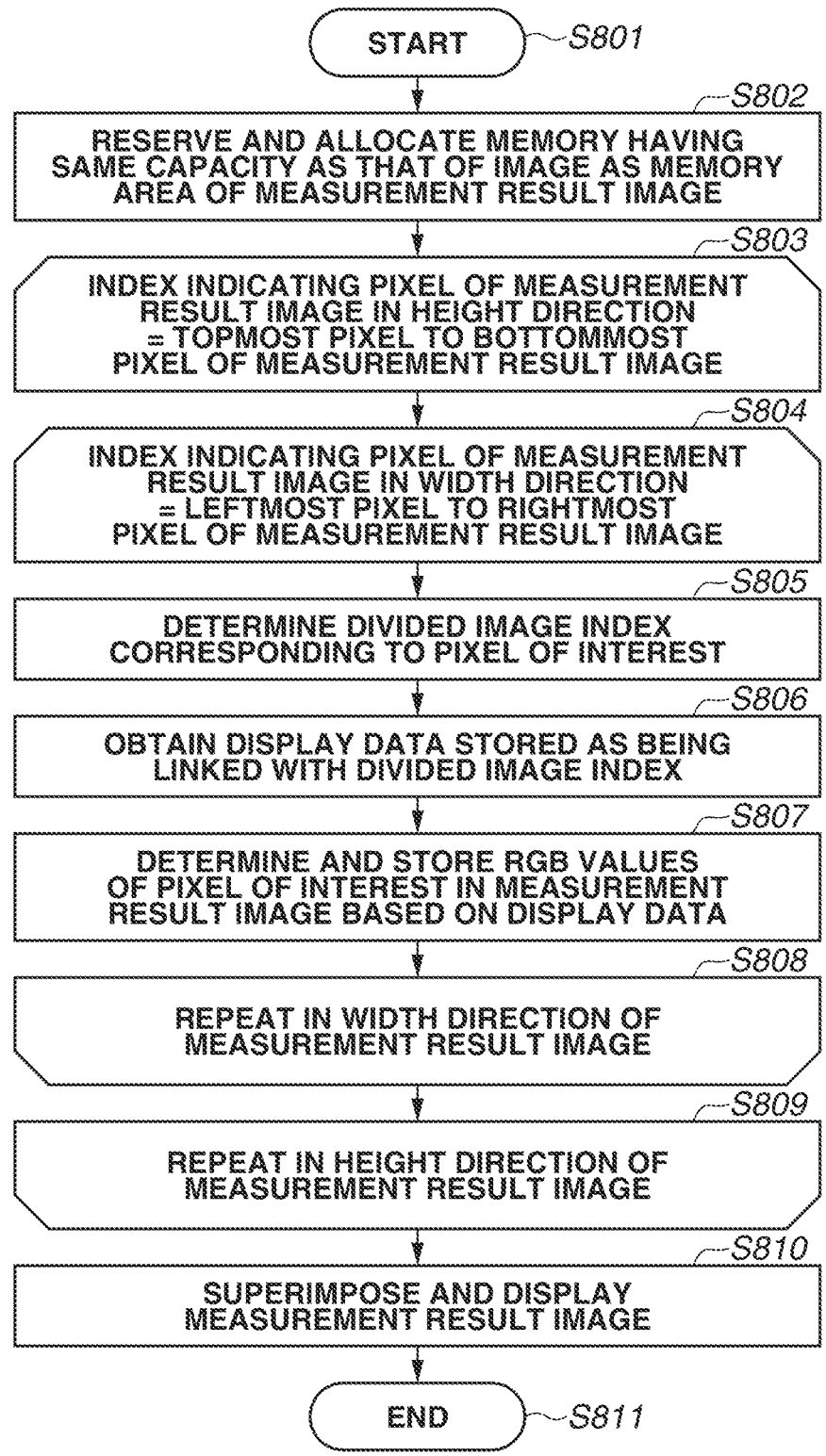
FIG. 8 is a flowchart illustrating display processing for displaying the amounts of change by the image processing.

FIG. 8 is a flowchart illustrating display processing for displaying the amount of change by the image processing. In step S801, the CPU 108 starts the processing illustrated in FIG. 8 if display data is given to the divided images as illustrated in FIG. 6. In FIG. 8, the CPU 108 generates the measurement result image 301 which indicates the amounts of change by the image processing and is to be superimposed and displayed on the image 212, based on the foregoing display data. Details are described below.

In step S802, the CPU 108 reserves, in the RAM 109, memory having capacity capable of storing an image having the same number of pixels as that of the image 212, and allocates the memory as a memory area for the measurement result image 301. In the present exemplary embodiment, the CPU 108 reserves a memory area having the same capacity as that of the memory area for the image 212.

In steps S803 and S804, the CPU 108 sets indexes indicating a pixel of interest to calculate a pixel value thereof in the measurement result image 301. In step S803, the CPU 108 incrementally sets the Y values of the first pixel (topmost pixel) to the end pixel (bottommost pixel) in the height direction (Y direction) of the measurement result image as the index indicating a pixel of the measurement result image 301 in the height direction (Y direction). In step S804, the CPU 108 incrementally sets the X values of the first pixel (leftmost pixel) to the end pixel (rightmost pixel) in the width direction (X direction) of the measurement result image as the index indicating the pixel of the measurement result image 301 in the width direction (X direction). By the processing of steps S808 and S809 to be described below, the processing of steps S805 to S807 is performed on all the pixels of the divided images, whereby RGB values are set for all the pixels of the measurement result image 301.

In step S805, the CPU 108 determines the divided image index corresponding to the pixel of interest based on the indexes set in steps S803 and S804. As illustrated in FIG. 7, a divided image index is assigned to each pixel of the image 212. For example, in step S805, the CPU 108 identifies the pixel that is included in the image 212 and located at the X and Y coordinates of the pixel of interest included in the measurement result image 301. The CPU 108 then determines the divided image index assigned to the identified pixel. In step S806, the CPU 108 refers to the information illustrated in FIG. 6 and thereby obtains the display data stored as being linked with the divided image index determined in step S805.

In step S807, the CPU 108 determines the RGB values of the pixel of interest included in the measurement result image 301 based on the display data obtained in step S806.

The CPU 108 then stores the RGB values into the area corresponding to the pixel of interest in the memory area reserved in step S802. Various methods may be used to determine the RGB values in step S807. For example, the RGB values are determined so as to represent color of higher density as the value of the display data increases. The RGB values may be set so that R=G=B, i.e., may be set using a grayscale representation. Only the R value may be set. Weights may be set for the respective RGB values, and the RGB values based on the weights may be set.

Figure 9:
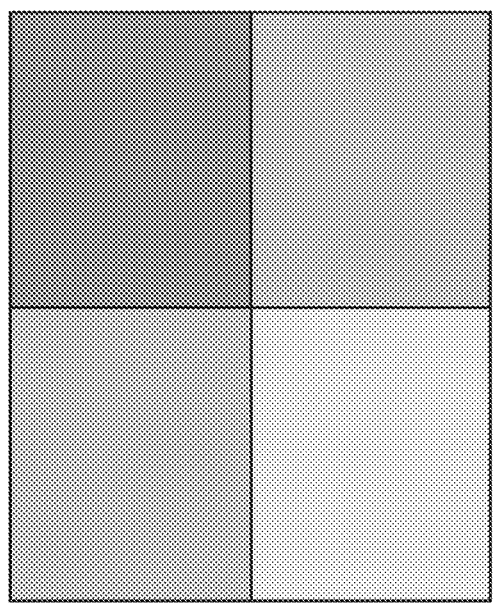
FIG. 9 is a diagram illustrating an example of a measurement result image.

In steps S808 and S809, the CPU 108 increments the X value and the Y value of the pixel of interest in the measurement result image 301, respectively, to set a new pixel of interest. By the loops of steps S803, S804, S808, and S809, the processing of steps S805 to S807 is performed with each pixel of the measurement result image 301 as the pixel of interest. If the processing of steps S802 to S809 is completed, the RGB values of all the pixels of the measurement result image 301 are thus stored, i.e., the measurement result image 301 is generated. FIG. 9 is a diagram illustrating an example of the measurement result image 301 generated by the processing described in steps S802 to S809 of FIG. 8. As illustrated in FIG. 9, in the measurement result image 301, pixels having pixel values corresponding to the amounts of change by the image processing in the respective areas of the image 212 are arranged at portions corresponding to the areas.

In step S810, the CPU 108 performs display control to superimpose and display the measurement result image 301 generated by the processing illustrated in steps S802 to S809 on the image 212. Specifically, the CPU 108 combines the measurement result image 301 as a transparent image with the image 212. The CPU 108 then displays the resulting combined image on the monitor 106 by controlling the monitor driver 104. Since the transparent image can be combined by using conventional processing, a detailed description thereof will be omitted. By the combination, the measurement result image 301 is superimposed and displayed as a semitransparent image on the image 212. The image 212 with which the measurement result image 301 is combined in step S810 may be the one after the image processing or before the image processing.

By the processing of step S810, the measurement result image 301 is superimposed and displayed on the image 212 in the preview area 202 as illustrated in FIG. 3. The user viewing the display illustrated in FIG. 3 can observe areas where the image processing has a larger effect and areas where the image processing has a smaller effect than in other areas among the four areas of the image 212. Suppose that the image processing is intended to be performed according to the printing characteristics of the printer 105. In such a case, the effect of the image processing on the printed image may be not observable even if the image-processed image 212 is displayed on the monitor 106. A print preview display in its original sense is thus difficult.

According to the present exemplary embodiment, as illustrated in FIG. 3, the magnitude of the effect of the image processing (the amount of change by the image processing) in areas other than a specific area of the image 212 can be displayed with respect to the magnitude of the effect of the image processing (the amount of change by the image processing) in the specific area. The user can thus observe areas of the image 212 where the image processing has a larger effect and areas where the image processing has a smaller effect. In the display illustrated in FIG. 3, the effect of the image processing is larger in an area having a higher density in the measurement result mage 301. The image processing thus has a larger effect in the upper left area of the image 212 than in the lower left area.

By observing the display illustrated in FIG. 3, the user can appropriately determine whether to perform the image processing during printing (whether to check the image processing application checkbox 207). Specifically, it may be acceptable to a specific user that the effect of the image processing is large on the upper left area of the image 212, but undesirable on the lower right area. For example, suppose that the image 212 is printed before by the same printer 105 without the image processing, and the user is satisfied by the printing result of the lower right area but finds the image processing needed on the upper left area. In such a case, the user viewing the display illustrated in FIG. 3 in re-printing the image 212 by the same printer 105 finds that the image processing has a large effect on the upper left area and a small effect on the lower right area. The user can thus determine that a desired print result is more likely to be obtained if the image processing is applied. By contrast, it may be acceptable to another user that the effect of the image processing is large effect on the lower right area of the image 212, but undesirable on the upper left area. In such a case, another user can determine that the image processing is appropriately unapplied. In such a case, the user may manually set the areas to apply the image processing to.

In FIG. 5, the processing for calculating the amounts of change before and after the image processing by the relative calculation method is described. Next, processing performed when the absolute calculation method is selected by the measurement method selection pull-down menu 209 will be described. A detailed description of content similar to that of the previous description will be omitted.

FIG. 10 is a flowchart illustrating processing for calculating the amounts of change before and after the image processing by the absolute calculation method. In step S1001, the CPU 108 starts the processing illustrated in FIG. 10 according to the generation of the difference image by the processing illustrated in FIG. 4 in a state where the absolute calculation method is selected.

The processing of steps S1002 to S1006 is similar to that of steps S502 to S506. A detailed description thereof will thus be omitted.

In step S1007, the CPU 108 absolutely assigns display data (brightness) to be used for superimposed display as illustrated in FIG. 3 to the divided images. Specifically, the CPU 108 calculates "the sum of differences in each divided image/(the number of pixels of the divided image×255)". The calculated information has a value of 0 to 1. The greater the amount of change by the image processing, the greater the value. The CPU 108 multiplies the calculated value by 255, and stores, as display data, the resulting value as being linked with the divided image index of each divided image. Since the calculation in step S1007 uses a value of 255, the maximum value of the display data is 255. Such a value is set on the assumption that the output image of the measurement result image 301 to be superimposed and displayed has a bit depth of 8 bits. The value may be modified as appropriate according to the number of bits displayable by the OS 102 or the monitor driver 104, depending on the output device.

Unlike the processing of FIG. 5, the processing of FIG. 10 does not compare the differences in the respective divided images between the divided images as described in step S507. The processing illustrated in FIG. 10 then calculates, as display data for each divided image, an absolutely-determined value independent of the other divided images. In the processing of step S807 in FIG. 8, the RGB values in each area of the measurement result image 301 are calculated as the absolutely-determined value independent of the other areas. Also in such a case, images of different colors according to the degree of effect (amount of change) of the image processing are superimposed and displayed on the respective areas of the image 212 as illustrated in FIG. 3. The user can thus compare the magnitudes of the degrees of effect (amounts of change) of the image processing between the areas of the image 212. Since the color of the superimposed and displayed images is determined in an absolute manner, whether the target image 212 to be image-processed is an image on which the image processing has a high degree of effect (causes large amounts of change) can be determined by comparison with other images.

By contrast, according to the relative measurement method of FIG. 5, images of different colors are superimposed and displayed according to the relationship in magnitude between the degrees of effect (amounts of change) of the image processing on the respective areas of the image 212. Even if a difference between the absolute values of the degrees of effect (amounts of change) of the image processing on the areas is small, the relationship in magnitude can be displayed to be easily recognizable to the user.

In the foregoing exemplary embodiment, the measurement result image 301 is superimposed and displayed on the image 212. However, this is not restrictive, and the measurement result image 301 may be displayed in a display area separate from that of the image 212. Further, the measurement result image 301 may be superimposed and displayed only on an area where the amount of change by the image processing is large or an area where the amount of change is small. Even in such a case, the relationship in magnitude between the amounts of change by the image processing in an area included in the image 212 and in another area can be presented. Non-image information indicating the relationship in magnitude may be displayed. For example, a text message indicating an area where the amount of change is large or an area where the amount of change is small may be displayed.

In the foregoing exemplary embodiment, a single image is described as a target image to check the amounts of change in pixel values by the image processing. However, this is not restrictive. The processing of FIGS. 4, 5 (or 10), and 8 may be performed on a plurality of images, and the plurality of images may be displayed together on the screen so that the amounts of change by the image processing are presented. In such a case, the selection of the measurement method (relative measurement method or absolute measurement method) may be reflected on all the plurality of images at a time. The measurement method may be individually selected for each of the plurality of images.

In the foregoing exemplary embodiment, the printer 105 is described as an example of the output device different from the display device on which the image 212 is previewed. However, this is not restrictive. A device such as a projector may be used. A different type of display device may be used. An example of the different type of display device is a high dynamic range rendering (HDR)-capable monitor. An HDR image is unable to be properly displayed by a monitor that does not supporting HDR. A user who does not own an HDR-capable monitor is therefore unable to check the display result of an image on which image processing according to the characteristics of the HDR-capable monitor are performed by using an HDR-capable monitor. According to the processing of the foregoing exemplary embodiment, the relationship in magnitude between the amounts of change by the image processing in a plurality of areas can be figured out by using an HDR-incapable monitor.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-232933, filed Dec. 4, 2017, which is hereby incorporated by reference herein in its entirety.

What is claimed is:

1. An information processing apparatus configured to perform display on a display device, the information processing apparatus comprising,
    at least one processor,
    wherein the at least one processor executes:
    performing, on a predetermined image, image processing which is based on a characteristic, of an output device different from the display device, in outputting the predetermined image;
    comparing a first amount of change when the image processing is performed on a first area in the predetermined image, and a second amount of change when the image processing is performed on a second area in the predetermined image; and
    displaying a result image in which a pixel having a first pixel value is arranged at a position corresponding to the first area and a pixel having a second pixel value is arranged at a position corresponding to the second area, on the display device,
    wherein the first pixel value is a pixel value based on a result of comparison by the comparison and the first amount of change, and the second pixel value is a pixel value based on the result of comparison by the comparison and the second amount of change.

2. The information processing apparatus according to claim 1, wherein the at least one processor displays the result image so that the result image overlaps the predetermined image.

3. The information processing apparatus according to claim 1,
wherein, in the comparison, the at least one processor determines order of amounts of change in a plurality of areas of the predetermined image when the image processing is performed, the plurality of areas including the first area and the second area, and
wherein the first pixel value is a pixel value based on the order determined for the first area, and the second pixel value is a pixel value based on the order determined for the second area.

4. The information processing apparatus according to claim 1, wherein in a case where a predetermined instruction is performed by a user, the first pixel value is a pixel value determined by a predetermined determination method based on the first amount of change regardless of the second amount of change, and the second pixel value is a pixel value determined by the predetermined determination method based on the second amount of change regardless of the first amount of change.

5. The information processing apparatus according to claim 1, wherein the at least one processor obtains a difference between a pixel value when the image processing is not performed and a pixel value when the image processing is performed in each of the first area and the second area of the predetermined image, and displays the result image on the display device based on the obtained differences.

6. The information processing apparatus according to claim 1, wherein the at least one processor performs image processing according to a printing characteristic of a printing apparatus in printing an image, the printing apparatus serving as the output device.

7. An information processing method, executed by at least one processor, for displaying an image on a display device and performing, on a predetermined image, image processing which is based on a characteristic of an output device different from the display device in outputting the predetermined image, the information processing method comprising
comparing a first amount of change when the image processing is performed on a first areas in the predetermined image, and a second amount of change when the image processing is performed on a second area in the predetermined image; and
displaying a result image in which a pixel having a first pixel value is arranged at a position corresponding to the first area and a pixel having a second pixel value is arranged at a position corresponding to the second area, on the display device,
wherein, the first pixel value is a pixel value based on a result of comparison by the comparison and the first amount of change, and the second pixel value is a pixel value based on the result of comparison by the comparison and the second amount of change.

8. The information processing method according to claim 7, wherein, in the display control, the measurement result image is displayed so that the measurement result image overlaps the predetermined image.

9. The information processing method according to claim 7,
wherein the comparing includes determining order of amounts of change in a plurality of areas of the predetermined image when the image processing is performed, the plurality of areas including the first area and the second area, and
wherein the first pixel value is a pixel value based on the order determined for the first area, and the second pixel value is a pixel value based on the order determined for the second area.

10. The information processing method according to claim 7, wherein in a case where a predetermined instruction is performed by a user, the first pixel value is a pixel value determined by a predetermined determination method based on the first amount of change regardless of the second amount of change, and the second pixel value is a pixel value determined by the predetermined determination method based on the second amount of change regardless of the first amount of change.

11. The information processing method according to claim 7, wherein the display control includes obtaining, a difference between a pixel value when the image processing is not performed and a pixel value when the image processing is performed in each of the first area and the second area of the predetermined image, and displaying the result image on the display device based on the obtained differences.

12. The information processing method according to claim 7, wherein image processing according to a printing characteristic of a printing apparatus in printing an image is performed, the printing apparatus serving as the output device.

13. A non-transitory storage medium storing a program for causing a computer to perform an information processing method for displaying an image on a display device and performing, on a predetermined image, image processing which is based on a characteristic of an output device different from the display device in outputting the predetermined image, the information processing method comprising
comparing a first amount of change when the image processing is performed on a first areas in the predetermined image, and a second amount of change when the image processing is performed on a second area in the predetermined image; and
displaying a result image in which a pixel having a first pixel value is arranged at a position corresponding to the first area and a pixel having a second pixel value is arranged at a position corresponding to the second area, on the display device,
wherein, the first pixel value is a pixel value based on a result of comparison by the comparison and the first amount of change, and the second pixel value is a pixel value based on the result of comparison by the comparison and the second amount of change.

* * * * *